No Printed Specification Available
220X
2 Sheets—Sheet 1.
D. WILKINSON.
SCREW THREADING MACHINE.
Patented Dec. 14, 1798.
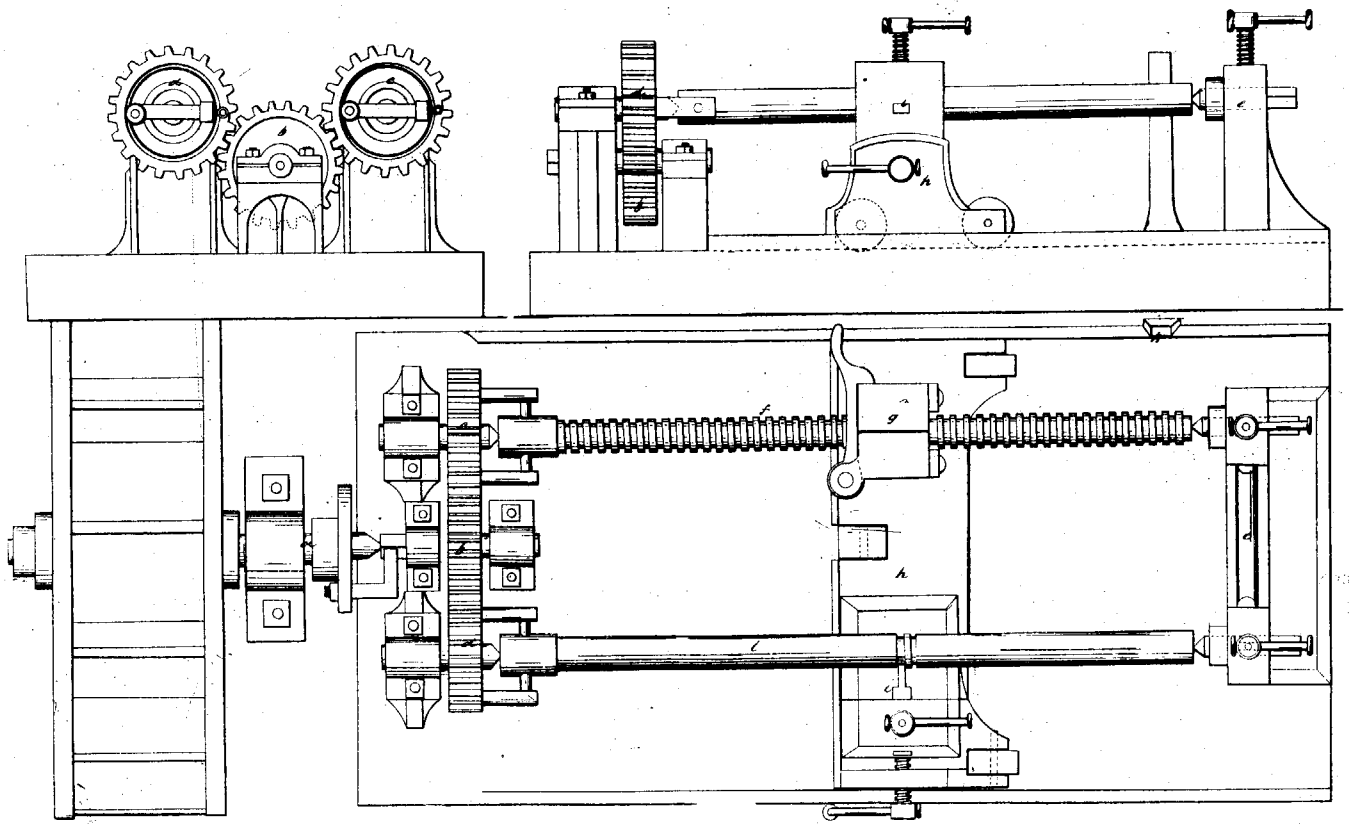
THE NORRIS PETERS CO., PHOTO-LITHO., WASHINGTON, D. C.

220 X
2 Sheets—Sheet 2.
D. WILKINSON.
SCREW THREADING MACHINE.
Patented Dec. 14, 1798.
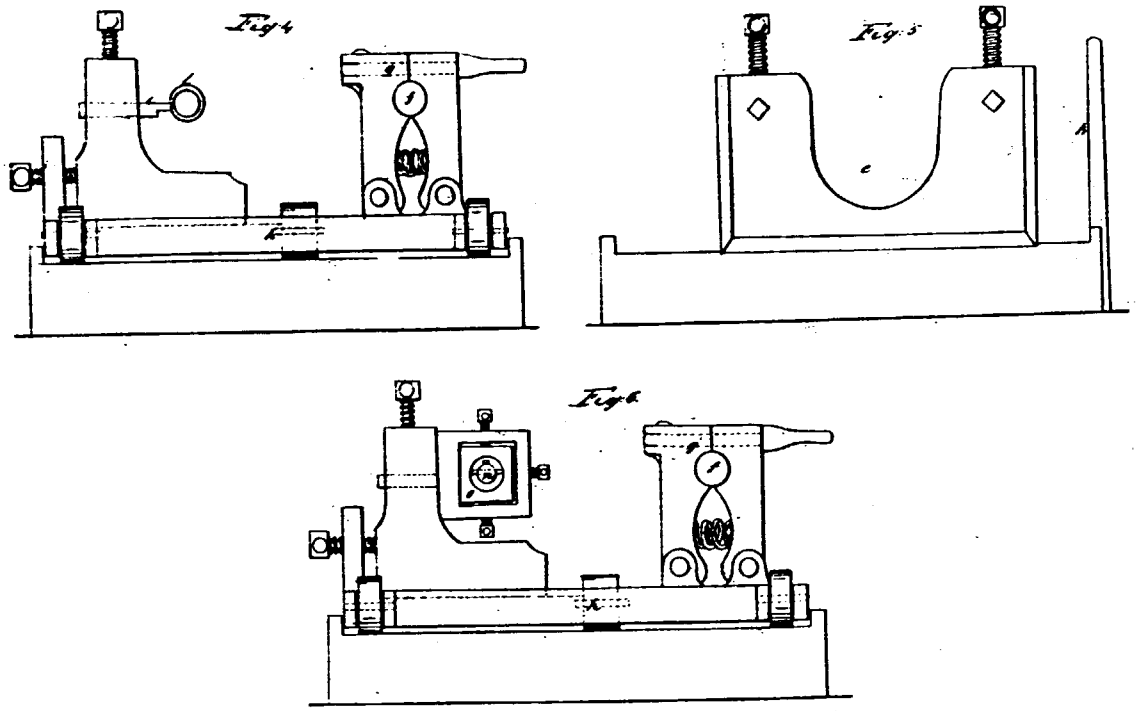

David Wilkinson of North Providence & State of Rhode Island.
Dated Dec. 14. 1798.

The schedule referred to in these Letters Patent and making part of the same containing a description in the words of the said David Wilkinson himself, of an Improvement, to wit, A machine for Cutting screws.

---

Specification of a machine for cutting screws, Invented by David Wilkinson of North Providence in the County of Providence and State of Rhode Island. ——
This machine resembles a turner's lath, fixed at the end of a large water wheel gudgeon which has a catch on the end that takes hold of a lock on an iron shaft of said machine, which has an iron spur wheel thereon to turn another wheel of equal size which runs on the centre pin of the head block on which the end of the screw runs which is in operation — with a catch from said cog wheel to a pin through the head of the screw to turn it. The other end of said screw turns on a centre which slides through a head stock, which is affixed to the place where it is most convenient by a perpendicular screw through the same. — At the other end of said machine which extends eighteen or twenty feet are head stocks, cog wheels, and centres: — The first of which centres receives a guide screw of wood or iron of any size or graduation. A lye shaft from the first mention-ed Iron shaft with a cog wheel on the end gives motion to the guide screw, which has a female screw or nut in two parts to run back by hand when unclosed — fixed in a carriage that runs on another carriage which vibrates back and forth on three rollers or trucks, as the aforesaid guide screw moves it. In this carriage is fixed the cutter which begins at the end and runs along as gradu-ated by the guide screw, when drawn knocks off the catch and stops of itself, this cuts the screw of any size or any number of threads wished for, and turns itself in the same manner. The nut or female screw is cut by an Iron shaft running on the centres where the male screw is cut with a cutter put through a mortise in said shaft — the nut fixed in the carriage and moved only the same guide screw, cuts the male screw. Upon the foregoing principles

220X

Dec. 14, 1798

Screws of every size may be made and by their running on centres they are perfectly true and uniform.

Witnesses

Ezra Palmer Adams
Wm Hazen Kimball

David Wilkinson

Patented December 14th 1798.